(12) United States Patent
Vettore et al.

(10) Patent No.: US 10,099,523 B2
(45) Date of Patent: Oct. 16, 2018

(54) VALVE FOR AIR CHAMBERS

(71) Applicant: RECORD S.P.A., Bonate Sotto (IT)

(72) Inventors: Claudio Vettore, Rezzato (IT); Marco Micheli, Bergamo (IT); Alfredo Rottoli, Bonate Sotto (IT)

(73) Assignee: RECORD S.P.A., Bonate Sotto (IT)

( * ) Notice: Subject to any disclaimer, the term of this patent is extended or adjusted under 35 U.S.C. 154(b) by 186 days.

(21) Appl. No.: 15/304,422

(22) PCT Filed: Dec. 16, 2014

(86) PCT No.: PCT/IB2014/066952
§ 371 (c)(1),
(2) Date: Oct. 14, 2016

(87) PCT Pub. No.: WO2015/159138
PCT Pub. Date: Oct. 22, 2015

(65) Prior Publication Data
US 2017/0043636 A1 Feb. 16, 2017

(30) Foreign Application Priority Data

Dec. 16, 2014 (IT) .................. UD14A0068

(51) Int. Cl.
F16K 15/20 (2006.01)
B60C 29/00 (2006.01)
B60C 5/22 (2006.01)

(52) U.S. Cl.
CPC .............. *B60C 29/007* (2013.01); *B60C 5/22* (2013.01); *F16K 15/20* (2013.01); *Y10T 137/3584* (2015.04); *Y10T 152/10594* (2015.01)

(58) Field of Classification Search
CPC .................. Y10T 137/3584; Y10T 137/87901
USPC ....................... 152/340.1, 427, 429
See application file for complete search history.

(56) References Cited

U.S. PATENT DOCUMENTS

| | | | | |
|---|---|---|---|---|
| 2,122,740 A * | 7/1938 | Eckenroth | ............. | B60C 29/007 137/223 |
| 2,189,485 A * | 2/1940 | Crowley | ............... | B60C 29/007 137/223 |
| 2,549,075 A | 4/1951 | Fox | | |
| 2,991,821 A | 7/1961 | Williams | | |
| 3,361,153 A * | 1/1968 | Krohn | ................... | B60C 29/007 137/234.5 |
| 3,476,168 A * | 11/1969 | Huber | ................... | B60C 29/007 137/234.5 |
| 3,536,119 A | 10/1970 | Mayer | | |

(Continued)

FOREIGN PATENT DOCUMENTS

DE 106448 11/1899

OTHER PUBLICATIONS

International Search Report and Written Opinion dated Mar. 31, 2015, PCT Patent Application No. PCT/IB2014/066952 filed Dec. 16, 2014, European Patent Office.

*Primary Examiner* — R. K. Arundale
(74) *Attorney, Agent, or Firm* — Mannava & Kang, P.C.

(57) ABSTRACT

A valve for air chambers includes a fixed body and a mobile selector body, wherein the mobile selector body is disposed coaxially in the fixed body. The mobile selector body is configured to slide with respect to the fixed body. The mobile selector body has a first position of use, associated during use to at least a first outlet, and a second position of use, associated during use to at least a second outlet.

19 Claims, 6 Drawing Sheets

(56) References Cited

U.S. PATENT DOCUMENTS

| | | | | |
|---|---|---|---|---|
| 4,765,358 A | * | 8/1988 | Cady | B60C 29/007 137/223 |
| 6,918,403 B2 | * | 7/2005 | Gabelmann | B60C 29/007 137/119.08 |
| 2010/0108217 A1 | | 5/2010 | Bradke | |

* cited by examiner

VALVE FOR AIR CHAMBERS

CLAIM FOR PRIORITY

The present application is a national stage filing under 35 U.S.C. § 371 of PCT application number PCT/IB2014/066952, having an international filing date of Dec. 16, 2014, which claims priority to Italian application number UD2014A000068, having a filing date of Apr. 16, 2014, the disclosures of which are hereby incorporated by reference in their entireties.

FIELD OF THE INVENTION

Forms of embodiment described here concern a two-way valve for air chambers to allow the selective passage of one or more fluids from a univocal entrance zone to two distinct outlet zones.

In particular, forms of embodiment described here can be used, by way of non-restrictive example, on tires of means of land transport used both on- and off-road.

Forms of embodiment described here also concern a tire on which said valve is installed.

BACKGROUND OF THE INVENTION

Tires are known for land transport means with two or more wheels, such as for example bicycles, motor cycles or suchlike, both for sport and amateur use and also for daily use, which for each of the wheels comprise a tire disposed in contact with the ground and mounted on rims, and a corresponding air chamber.

This conventional solution, in some circumstances, as for example regarding the use of mountain bikes, cycles, motor cycles and/or in other situations, mostly in competitive sport, is not always the best for users regarding the inflation pressure. Indeed, if for traveling over certain ground, for example with poor adherence, a lower inflation pressure is advised, this can contrast with the need to safeguard the rims when there are obstacles such as sidewalks, curbs or other.

To meet these requirements, in the production of tires, double chamber tires have been developed, with different inflation pressures. In particular, a first air chamber can be positioned adherent to the rim and a second air chamber can be made in the space between the first air chamber and the tire. This configuration allows to reduce the bulk of the two air chambers, equating them in size to the technologies that use a single air chamber. An air chamber valve can be associated to each air chamber, accessible for the user with inflation tools and which allows to inflate them to different pressures.

The possibility of defining two zones at different pressures can influence the protection of the rim from damage and the driving performance of the means.

In particular, the first air chamber, nearer the rim, can be inflated to high pressure (for example 100 psi) and can act as a shock absorber and prevent damage to the rim in the case of jumps and uneven ground, or obstacles. Another advantage of keeping a high pressure in the first air chamber is that it allows an optimum connection between the tire and the rim without them being distant from each other.

However, in order to improve driving conditions, especially off-road, it is common practice to lower the pressure in the air chamber for example to 0-10 psi in order to increase the area of contact between ground and tire. In the double air chamber systems described, this can be achieved by acting on the pressure in the second air chamber, leaving the pressure in the first air chamber unchanged. In particular, the pressure in the second chamber is taken to these conditions of low pressure because it is the portion of the air chamber that directly affects adherence to the ground.

The presence of two air chambers that can be inflated to different pressures allows to identify two volumes that exploit the advantages deriving from using high and low pressures together. However, this technology provides to install one valve for each air chamber. In this way there is a possible increased cost for the producer, since the cost of the valve greatly affects the overall cost of the tire; moreover, the rims currently on the market have to be modified to house the two valves, and there is a greater inflation time due to the need to move from one valve to the other. Finally, there may be unbalanced weight on the rim due to housing two distinct valves.

Document DE-A-106448 describes a valve for the passage of air between two air chambers of a known type.

Document U.S. Pat. No. 2,549,075 describes a valve for double chamber tires. The valve has two outlets for both the air chambers, or one outlet for a single chamber. Consequently, this known solution does not allow to selectively inflate one air chamber or the other.

Document U.S. Pat. No. 2,991,821 describes a valve for compartmentalized tires with two air chambers.

Document U.S. Pat. No. 3,536,119 describes a dual valve for known tires.

Document US-A-2010/0108217 describes a system of valves for tires with a double air chamber that functions as a two-way selector tap.

There is therefore a need to perfect a valve for air chambers that can overcome at least one of the disadvantages of the state of the art.

In particular, one purpose of the present invention is to obtain a single valve that can interact with a double chamber tire where it is not necessary to have two valves, one for each chamber.

Another purpose of the present invention is to obtain a valve for tires with two air chambers that is simple to use, with a possible production cost that is lower than current alternatives and/or with a possible overall weight less than current alternatives.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

Forms of embodiment described here concern a valve for air chambers suitable to cooperate with a tire having two air chambers disposed adjacent and mainly concentric with respect to each other.

For example, the two air chambers are disposed around the same rim, and cooperate with a tire to form a wheel for a vehicle, advantageously with two or three wheels, although an application on one-wheeled vehicles or with four or more wheels is not excluded.

According to one form of embodiment, the valve comprises a fixed body and a mobile selector body. The mobile selector body can be disposed coaxially in the fixed body and slide with respect to the fixed body along a sliding and rotation axis. The mobile selector body has a first position of use, associated during use to at least a first outlet, and a second position of use, associated during use to at least a second outlet. The passage between the first and second position of use of the mobile selector body occurs, in a preferred form of embodiment, by rotation of the mobile selector body with respect to the fixed body around an axis of rotation.

In some forms of embodiment, the valve for air chambers can be included in a tire for air chambers. In these forms of embodiment, the valve for air chambers can be configured so that a first air chamber is associated to a first position of use and a second air chamber is associated to a second position of use.

According to one feature, the fixed body is made with an internal cavity and the internal cavity comprises at least a seating, said at least one seating housing at least a first sealing element and a second sealing element.

According to one feature, the mobile selector body and the fixed body are configured to be coupled by screwing, the mobile selector body providing a threaded portion and the fixed body being provided with a first portion that comprises, in the internal cavity, a threaded zone mating with the threaded portion.

According to one feature, the fixed body comprises a second portion adjacent to the first portion, the second portion comprising one or more first radial outlets and one or more second longitudinal outlets.

According to one feature, the mobile selector body comprises an entrance zone, a channel for the passage of the air and one or more radial outlets configured to communicate respectively with the one or more first radial outlets in the first position of use and with the one or more second longitudinal outlets in the second position of use.

According to one feature, a mechanical stop system is provided, configured to prevent the axial dis-insertion of the mobile selector body and fixed body, and a mechanical end-of-travel system is provided, configured to define an end-of-travel of the rotation screwing of the mobile selector body and fixed body.

The use of the valve for air chambers according to features described here allows selective access to two distinct air chambers, each operating at a different pressure. Furthermore, the possibility of selecting the air chamber on which to operate, by rotating the mobile selector body, allows to accelerate the overall inflation times.

The valve according to some forms of embodiment described here can be used instead of the normal valves on the market with one air chamber, without making any modifications to the rims.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
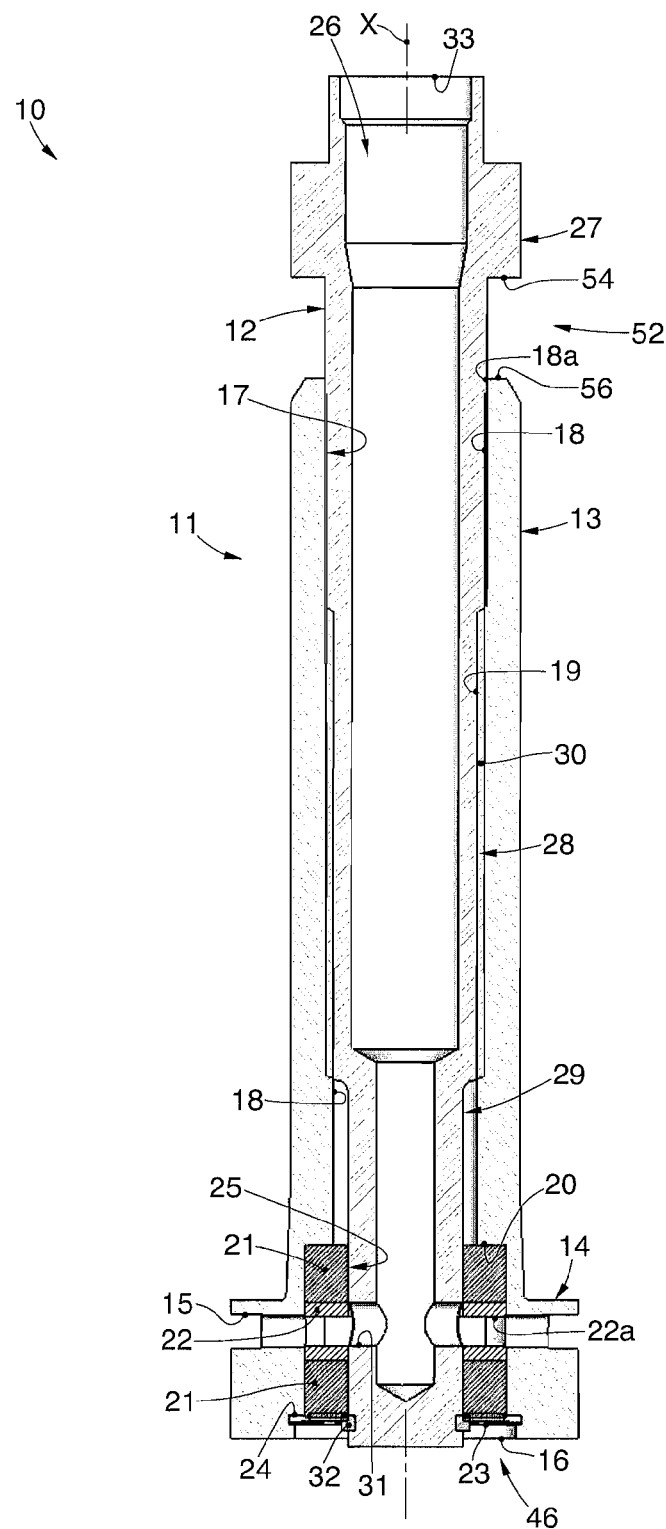
FIG. 1 is a section of a valve for air chambers according to forms of embodiment described here.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

Figure 2:
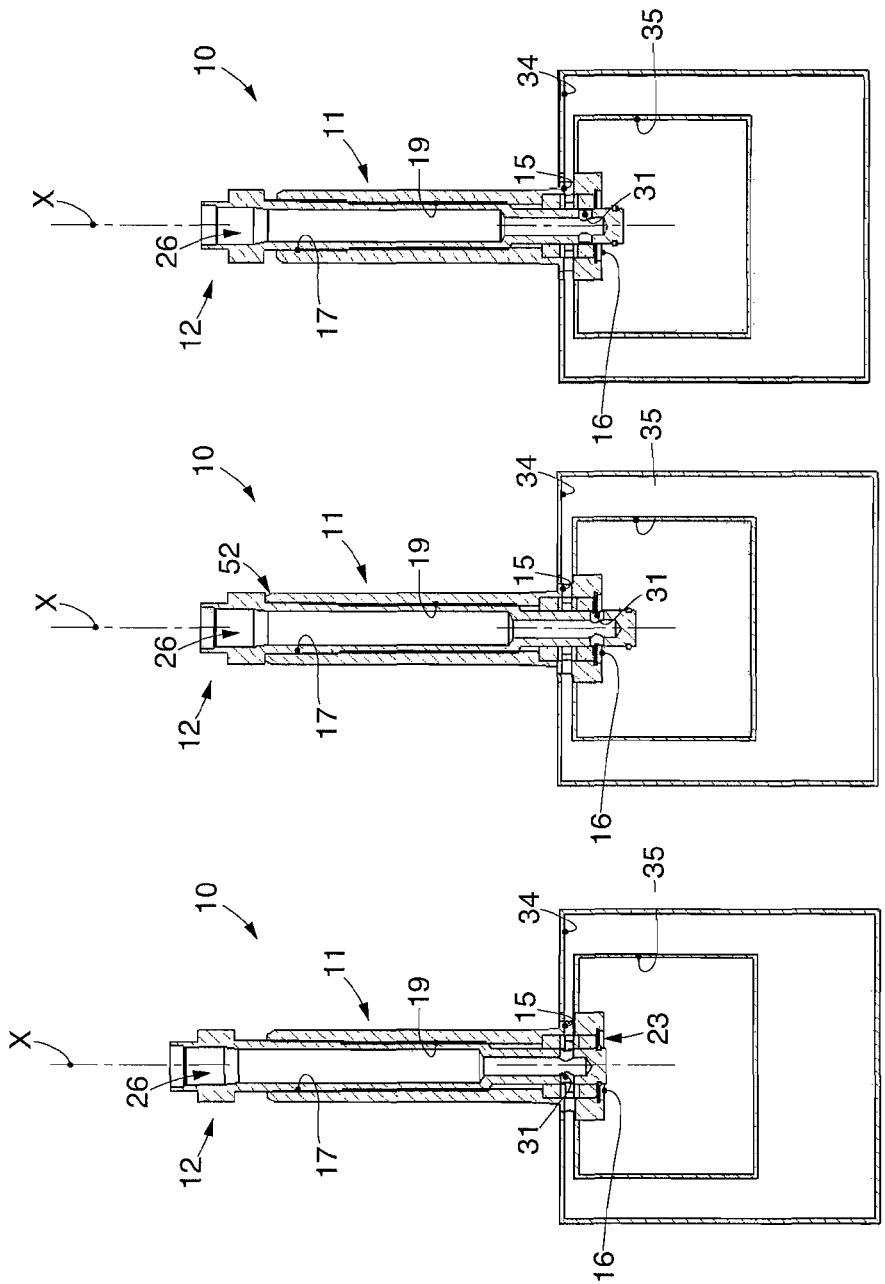
FIGS. 2a, 2b and 2c are schematic views of the valve in FIG. 1 in different positions of use.
Figure 3:
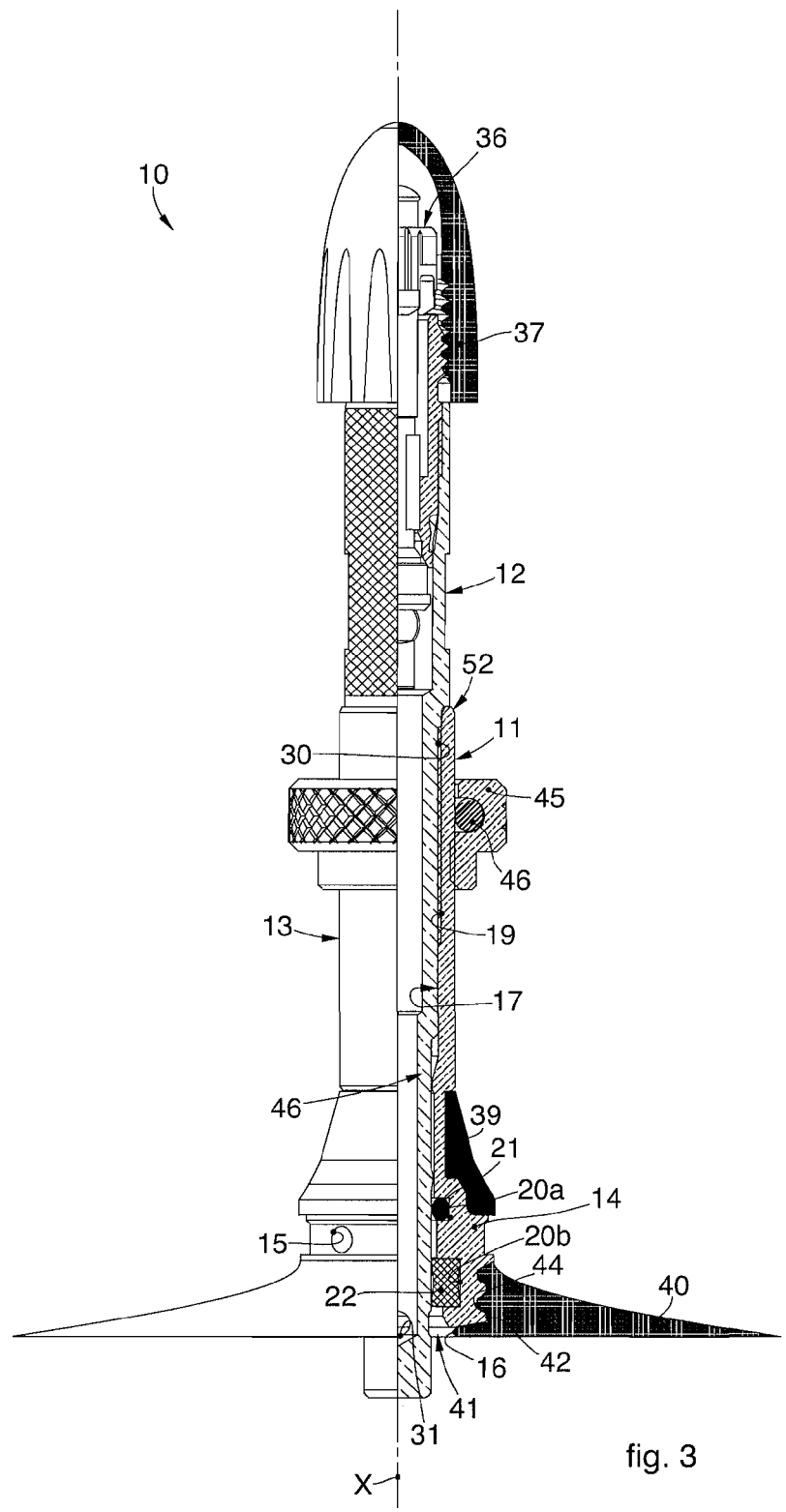
FIGS. 3, 4, 5 and 6 are part sections of a valve for air chambers according to some forms of embodiment described here in different positions of use.

FIGS. 1-2 are used to describe forms of embodiment, which can be combined with all the forms of embodiment described here, of a valve for air chambers 10 according to the present description, suitable to cooperate with a tire having two air chambers disposed adjacent and mainly concentric with respect to each other.

According to the present description, the valve for air chambers 10 can comprise a fixed body 11 and a mobile selector body 12 configured to be selectively mobile with respect to the fixed body 11.

The fixed body 11 and the mobile selector body 12 can be configured as a shaft, or similar tubular element, with the second being coupled mobile axially inside the first, that is, the telescopic type.

The fixed body 11 and the mobile selector body 12 are disposed during use coaxially one in the other with respect to a common axis X, in particular the fixed body 11 can be configured to house the mobile selector body 12.

The mobile selector body 12 can have a first position of use, or high position, associated during use to at least a first outlet 15, and a second position of use, or low position, associated during use to at least a second outlet 16. The first outlet 15 can be made radial, while the second outlet 16 can be made longitudinal, that is, in a direction parallel to the axis X.

According to some forms of embodiment, described for example using FIG. 1, the fixed body 11 can be made with two first outlets 15 and one second outlet 16.

In some forms of embodiment, which can be combined with all the forms of embodiment described here, the number of each first outlet 15 and second outlet 16 may be different, for example one, two, three and so on.

In particular, according to possible implementations, the first outlets 15 can be transversely through apertures in the walls of the fixed body 11. Moreover, according to possible implementations, the second outlet 16 can be a longitudinal or axial aperture provided on a terminal or bottom part of the fixed body 11. When the mobile selector body 12 is suitably positioned, the second outlet 16 can be defined with a circular crown shape made between the fixed body 11 and the mobile selector body 12.

According to some forms of embodiment, which can be combined with all the forms of embodiment described here, the first and second position of use of the mobile selector body 12 can be defined by rotating the mobile selector body 12 with respect to the fixed body 11 around the axis of rotation X.

The fixed body 11 can comprise a first portion 13, which can be configured to receive the mobile selector body 12, and a second portion 14 in which the first outlets 15 and the second outlets 16 can be made. The first portion 13 and the second portion 14 can be adjacent to each other, consecutive along the axis X.

According to forms of embodiment described using FIG. 1, the first portion 13 and the second portion 14 can be coaxial, made in a single body and can both have a cylindrical external shape.

In some forms of embodiment, which can be combined with all the forms of embodiment described here, the first portion 13 and the second portion 14 can be made with an external shape that is parallelepiped, conical, polygonal, of different shapes, or any combination of the above.

In some forms of embodiment, which can be combined with all the forms of embodiment described here, the first portion 13 and the second portion 14 can be made with a different diameter (or equivalent diameter), without departing from the field of the present invention.

In some forms of embodiment, which can be combined with all the forms of embodiment described here, the first portion 13 and the second portion 14 can be hollow longitudinally and can define a common internal cavity 17 longitudinally through in the fixed body 11. The internal cavity 17 is configured to receive the mobile selector body 12. In particular, the mobile selector body 12 can be moved axially along the internal cavity 17. The first portion 13 is provided with an insertion aperture 18a through which it is possible to insert the mobile selector body 12 into the internal cavity 17, initially into the part that belongs to the first portion 13 and subsequently also into the part that belongs to the second portion 14. For example, the insertion aperture 18a of the fixed body 11 can be in a position opposite the second outlet 16.

In particular, the first portion 13 can be made with internal walls 18 of a shape suitable to receive and allow the rotation of the mobile selector body 12 with respect to the fixed body 11. The internal walls 18 delimit the part of internal cavity 17 that belongs to the first portion 13.

The internal walls 18 can also comprise a threaded portion 19 which for example can be extended for the entire length of the internal walls 18, or which can affect one or more partial and/or intermediate segments of the internal walls 18. The threaded portion 19 can be for example a threaded segment of part or all of the surface of the internal walls 18. The threaded portion 19 is advantageously sized in length in coordination with the desired travel that the mobile selector body 12 can make inside the fixed body 11.

For example, in some forms of embodiment, the threaded portion 19 can extend only for one segment of the walls 18 of the mobile selector body 12.

In some forms of embodiment, which can be combined with all the forms of embodiment described here, the mobile selector body 12 can be provided with a threaded portion or threaded zone 30, mating with the threaded portion 19 provided on the internal walls 18 of the fixed body 11, to make a mating screw system (mobile selector body 12—mother screw (fixed body 11)).

The threaded portion 19 can advantageously be coupled with the threaded portion or threaded zone 30, made on the mobile selector body 12, as discussed hereafter.

According to some forms of embodiment, which can be combined with all the forms of embodiment described here, the fixed body 11 can comprise at least one sealing seating 20, for example made in the second portion 14, or partly in the first portion 13 and partly in the second portion 14.

According to some forms of embodiment, for example the part of the internal cavity 17 that is provided astride the first portion 13 and the second portion 14 of the fixed body 11 can comprise said sealing seating 20. Therefore, in possible implementations, part of the sealing seating 20 belongs to the first portion 13 and part of the sealing seating 20 belongs to the second portion 14, or in other implementations the sealing seating 20 belongs only to the second portion 14. The sealing seating 20 can be defined by a longitudinal wall, for example cylindrical in shape, and a transverse abutment wall, for example shaped like a circular crown. The transverse abutment wall can be provided in the part of the sealing seating 20 that belongs to the first portion 13 of the fixed body 11, or in the second portion 14, depending on the embodiments. The two walls of the sealing seating 20 can be adjacent to each other, in particular they can have a common edge in correspondence with the external diameter of the transverse wall. The two walls of the sealing seating 20 can thus be configured to define a step-like seating, or undercut.

The sealing seating 20 is configured to house at least a first sealing element 21 which during use can be made to abut on the transverse abutment wall of the sealing seating 20. For example, the first sealing element 21 can be provided in the part of the sealing seating 20 that belongs to the first portion 13 of the fixed body 11, or in the second portion 14, depending on the forms of embodiment. The one or more first outlets 15 can be made facing the sealing seating 20, that is, they can be made passing through the second portion 14, opening radially on one side toward the outside and on the other side toward the common internal sealing seating 20.

The first sealing element 21 can be a component with a shape mating with the walls of the sealing seating 20, for example cylindrical, made with a longitudinally through aperture. Furthermore, the first sealing element 21 can be made of flexible material that adapts to the shape of the elements with which it is in contact, such as for example an elastic-plastic material. An element that respects these requirements can be, for example, a packing or a flexible ring, or an annular packing. For example, the first sealing element 21 can have a rectangular cross section (see FIG. 1).

In some forms of embodiment, which can be combined with all the forms of embodiment described here, a second sealing element 22 can be provided, such as for example a bushing, for example made of the same shape and material as the first sealing element 21. The second sealing element 22 can be disposed in the part of the sealing seating 20 that belongs to the second portion 14 of the fixed body 11. In particular, the second sealing element 22 can be disposed downstream of the first sealing element 21 provided in the part of the sealing seating 20 that belongs to the first portion 13 of the fixed body 11, with respect to the direction of insertion of the mobile selector body 12 into the internal cavity 17 along the axis X.

In some forms of embodiment, which can be combined with all the forms of embodiment described here, the second sealing element 22 can be made of a different shape and material from the first sealing element 21.

Additionally, the second sealing element 22 can be made with at least one hole 22a passing radially through each first outlet 15. If the second sealing element 22 is a bushing, the through hole 22a can be made in the walls of the bushing.

In some forms of embodiment, it may be advantageous to provide more than one first sealing element 21 in the sealing seating 20, in particular, see for example FIG. 1, two first sealing elements 21. The other first sealing element 21 can be provided in the part of the sealing seating 20 that belongs to the first portion 13 of the fixed body 11. In this solution, the two first sealing elements 21 can be alternated with the second sealing element 22.

The first sealing elements 21 and the second sealing element 22, intermediate between them, can be coaxially overlapping so that the respective longitudinal apertures are aligned along the axis of rotation X. In particular, a first proximal sealing element 21 may be provided, disposed in the part of the sealing seating 20 provided in the first portion 13, and a first distal sealing element 21 disposed in the part of the sealing seating 20 provided in the second portion 14.

In some forms of embodiment, which can be combined with all the forms of embodiment described here, a mechanical stop system 46 can be provided, configured to prevent the axial dis-insertion of the mobile selector body 12 and fixed body 11.

In some forms of embodiment, which can be combined with all the forms of embodiment described here, a mechanical end-of-travel system 52 may be provided, configured to determine an end-of-travel of the rotation screwing of the mobile selector body 12 and fixed body 11, that is, to prevent an excessive axial insertion or infinite screwing.

In this way, advantageously, the mobile selector body 12 is always partly inserted in the fixed body 11.

For example, in some forms of embodiment, the mechanical stop system 46 can include a clamping element 23.

The first sealing elements 21 and the second sealing element 22 can be held in abutment in the sealing seating 20 by the clamping element 23. In particular, the first sealing elements 21 and the second sealing element 22 can be held axially packed, thanks to the clamping element 23. The clamping element 23 can be configured as an annular plate or ring, with a shape mating with that of the portion of internal cavity 17 associated with the second portion 14. Furthermore, the clamping element 23 can be made with a longitudinally through aperture, coaxial to the axis X and compatible in size with the longitudinal apertures associated with the first sealing elements 21 and the second sealing element 22. The clamping element 23 can be disposed downstream of the first distal sealing element 21 disposed in the part of the sealing seating 20 provided in the second portion 14.

The clamping element 23, if present, can also be provided when there is only one first sealing element 21 and a second sealing element 22. In this case, the clamping element 23 can be disposed downstream of the second sealing element 22.

The clamping element 23 can be attached to the fixed body 11, for example by a fixed-joint coupling in a recess 24 made in the fixed body 11 itself. In particular, the recess 24 can be a transverse hollow or groove in the walls of the internal cavity 17 of the fixed body 11.

Alternatively, the clamping element 23 may not be provided, and the second sealing element 22 can itself function as a clamping element, being disposed for example constrained, for example axially lodged, in a suitable seating or undercut made in the second portion 14.

In some forms of embodiment, the first sealing elements 21, or the first sealing element 21 when only one is provided as described above, the second sealing element 22 and the clamping element 23 if present can overlap each other or be made in a single body by known techniques, and all in all can define or delimit an aperture 25.

According to the present description, the aperture 25 can extend in a longitudinal and coaxial direction with respect to the axis of rotation X.

The mobile selector body 12 according to some forms of embodiment described here can comprise a first zone 27, which in the first position of use can be exposed, that is external, with respect to the fixed body 11, a second zone 28 connecting the mobile selector body 12 to the fixed body 11, and a third zone 29, whose position can define the first and second position of use.

According to some forms of embodiment, the first zone 27 can have a uniformly cylindrical shape. Alternatively, it can be made with suitable shaped protrusions, see for example FIG. 1, to facilitate the rotation of the mobile selector body 12 with respect to the fixed body 11.

The second zone 28 can be located during use in the internal cavity 17 and can have mating shape and size for insertion in the internal cavity 17. For example, the second zone 28 of the mobile selector body 12 can be configured to function as a connection with the threaded portion 19 of the fixed body 11. In particular, the external walls of the second zone 28 of the mobile selector body 12 can have the threaded zone 30 which, in size and pitch of the thread, can be mating with the threaded portion 19 made in the internal cavity 17. The threaded portion 19 of the fixed body 11 and the threaded zone 30 of the mobile selector body 12 can be mating with each other so as to obtain a threaded coupling of the fixed body 11 and the mobile selector body 12.

In some forms of embodiment, the fixed body 11 and the mobile selector body 12 can be connected by other or alternative techniques, such as for example snap-in attachments.

The third zone 29 of the mobile selector body 12 can be configured with a cylindrical external shape, and can have a smaller diameter than the second zone 28. The third zone 29 can be inserted into the aperture 25 so as to keep the axis of rotation X of the mobile selector body 12 unchanged during its selective movement between the first and second position of use. For this reason, the third zone 29 can have a smaller diameter than that of the aperture 25.

In correspondence with a terminal portion of the third zone 29 of the mobile selector body 12, outlets 31 can be provided, for example made radial, so that the air can pass. The outlets 31 can be provided to cooperate, for example to be put in communication, selectively with the one or more first outlets 15 and with the respective at least one hole 22a of the second sealing element 22 if provided (first position of use, FIG. 2a), or with the second outlet 16 of the second portion 14 of the fixed body 11 (second position of use, FIG. 2b), depending on the axial positions assumed by the mobile selector body 12, or said outlets 31 can be obstructed by a first sealing element 21 (third or intermediate position, FIG. 2c).

Furthermore, in correspondence with a terminal portion of the third zone 29, a clamping strip 32 can be provided, for example attached, such as for example an annular strip, an annular packing or an O-ring. The clamping strip 32 can be configured to function as a holding element, or end-of-travel abutment, to prevent any unwanted axial dis-insertion of the mobile selector body 12 toward the outside. The clamping strip 32 can be made of elastic material suitable to adapt to the shape and diameter of the mobile selector body 12. The clamping strip 32 can be attached to the mobile selector body 12 by fixed-joint coupling, by housing it in a suitable seating made in the mobile selector body 12 itself. During use, the clamping strip 32 can protrude with respect to the diameter of the third zone 29 of the mobile selector body 12 with a diameter that can be more than that of the aperture 25.

According to some forms of embodiment, the mobile selector body 12 can be an element made in a single body, for example made hollow inside to define a longitudinal passage channel 26.

In possible implementations, the passage channel 26 can be configured with an overall decreasing internal section, considered in the direction of passage of the fluid in the passage channel 26.

According to some forms of embodiment, described for example using FIG. 1, a portion of the passage channel 26 associated with, that is belonging to, the first zone 27 of the mobile selector body 12 can be made with a decreasing section, the portion associated with the second zone 28 with a constant section, and the portion associated with the third zone 29 with again a decreasing section.

In some forms of embodiment, it is possible to provide a different organization of the section of the passage channel 26, for example uniformly decreasing, without departing from the field of the present invention.

The passage channel 26 can comprise at the upper part an entrance zone or aperture 33, coaxial with respect to the axis of rotation X, and at the lower part said outlets 31, radially through in the walls of the mobile selector body 12. Therefore, the passage channel 26 can be a channel with a mainly longitudinal development, which extends from the entrance zone or aperture 33 to the outlets 31 which, as we said, can be made radially. Both the passage channel 26 and the outlets 31 can have for example, but not restrictively, a circular cross section. The air arriving from an inflation device or apparatus during use can be introduced through the entrance zone or aperture 33 and can exit through the outlets 31.

The first position of use of the mobile selector body 12, according to forms of embodiment described above, can be determined or established by removing the mobile selector body 12, for example by suitable rotation, with respect to the top of the fixed body 11 (see for example FIG. 2*a*). This can be done by taking the clamping strip 32 to abut on the clamping element 23 so that the clamping element 23 functions as an end-of-travel for another rotation of the mobile selector body 12. In correspondence with the first position of use, each outlet 31 of the mobile selector body 12 can be aligned with a hole 22*a* of the second sealing element 22, in turn aligned with a first outlet 15.

The second position of use of the mobile selector body 12 can be determined by rotating the mobile selector body 12 until it reaches a condition of complete insertion of the second zone 28 into the fixed body 11 (see for example FIG. 2*b*). Alternatively, the second position can be identified when the second zone 28 abuts against the first sealing element 21, acting as an end-of-travel for a further rotation of the mobile selector body 12. In this condition the outlets 31 of the mobile selector body 12 can be external with respect to the fixed body 11 and aligned with the second outlet 16.

In some forms of embodiment it is possible to configure the mobile selector body 12 in a third position, called intermediate position, in which the outlets 31 can face toward one of the first sealing elements 21, isolating the entrance zone 33 from the first 15 and second outlets 16, see for example FIG. 2*c*.

According to some forms of embodiment, the valve for air chambers 10 can be comprised in a tire with a double air chamber, for convenience not shown in its entirety in the attached drawings. The double air chamber tire can comprise a first air chamber 34, or external air chamber, and a second air chamber 35, or internal air chamber, different from the first air chamber 34, shown schematically in FIGS. 2*a*, 2*b*, 2*c*. The valve for air chambers 10 can be inserted radially in the double air chamber tire and configured so that a first air chamber 34 is associated with a first position of use, and a second air chamber 35 is associated with a second position of use.

The fixed body 11 can be constrained to the first chamber 34 and the second chamber 35 by gluing means that prevent the air escaping, such as for example glues or elastomers or other means suitable for the purpose.

Furthermore, the movement between the first and second position of use can put the first chamber 34 and the second air chamber 35 respectively into communication with the entrance zone or aperture 33 of the mobile selector body 12, so the air can pass.

According to some forms of embodiment, the one or more first sealing elements 21 and the second sealing element 22, correctly located in abutment in the sealing seating 20, can physically separate the first chamber 34 and the second air chamber 35. In other words, when one of the two air chambers is in communication with the entrance zone or aperture 33, the other air chamber is isolated with respect to the entrance zone or aperture 33.

FIGS. 3, 4, 5 and 6 are used to describe other forms of embodiment, which can be combined with all the forms of embodiment described here, of a valve 10 for air chambers, in which a single first sealing element 21 and a second sealing element 22 are provided. In these forms of embodiment, a single sealing seating 20 is not provided in the fixed body 11, but instead two sealing seatings 20*a*, 20*b* are provided, that is, a first proximal sealing seating 20*a*, nearer to the entrance zone or aperture 33, and a second distal sealing seating 20*b*, that is, more distant from the entrance zone or aperture 33.

The first sealing seating 20*a* can be configured to receive the first sealing element 21, that is, a first proximal sealing element. The first sealing seating 20*a* can be made inside the second portion 14, or in the terminal part of the first portion 13, adjacent to the second portion 14. the first sealing seating 20*a* can be made for example as an annular groove or undercut, for example with a quadrangular section, such as rectangular.

In the same way, the second sealing seating 20*b* can be configured to receive the second sealing element 21 and typically can be made inside the second portion 14.

The second sealing seating 20*b* can be made with a shape similar to the first sealing seating 20*a*, but the sizes, for example the width, may vary, to accommodate or receive a second sealing element 22 which can have a different thickness or height, for example bigger, than the first sealing element 20.

In these forms of embodiment, in the part of the internal cavity 17 of the second portion 14 that is intermediate between the first sealing seating 20*a* and the second sealing seating 20*b*, said one or more first outlets 15 can be provided, made as radial through holes through the second portion 14, which communicate with the internal cavity 17. Said one or more first outlets 15 can be aligned in communication with the one or more outlets 31 of the mobile selector body 12, for example in the first position of use as described above using FIG. 2*a*.

In these forms of embodiment, said second outlet 16 is also provided, which opens onto the bottom or terminal part of the second portion 14 of the fixed body 11, in a position opposite said entrance zone or aperture 18*a*.

FIGS. 3, 4, 5 and 6 are used to describe forms of embodiment, which can be combined with all the forms of embodiment described here, in which the valve 10 comprises a packing 39, for example with a conical or truncated cone shape, fitted onto the second portion 14 of the fixed body 11. The packing 39 for example can be super-injected onto the second portion 14.

FIGS. 3, 4, 5 and 6 are used to describe forms of embodiment, which can be combined with all the forms of embodiment described here, in which the valve 10 comprises a sealing body 40, also called standard sealing disc, for example made of vulcanized rubber. The sealing body 40 can be coupled with the second portion 14 of the fixed body 11. The sealing body 40 can be annular in shape, such as circular or elliptical, or a similar shape or also another shape, depending on the type of air chamber. The sealing body 40 can be provided with a central through seating 41 to receive the fixed body 11. In particular, the sealing body 40 can be connected to the second portion 14 of the fixed body 11, which for example can be inserted into the central through seating 41 and clamped there. To this purpose, the second portion 14 can be externally provided with a corrugated surface 42, formed by crests and valleys, able to cooperate, firmly gripping and holding, with a mating corrugated surface 44, formed by crests and valleys, made on the internal walls of the central through seating 41 of the sealing body 40. The sealing body 40 can for example be super-injected onto the second portion 14.

FIGS. 3, 4, 5 and 6 are used to describe forms of embodiment, which can be combined with all the forms of embodiment described here, in which the valve 10 is provided with a valve body 38, drivable by a user and which can cooperate with an inflation apparatus. The valve body 38 can be the needle valve type, and can be coupled with, or inserted into, the mobile selector body 12. A cap 37 can be provided to protect the valve body 38.

FIGS. 3, 4, 5 and 6 are used to describe forms of embodiment, which can be combined with all the forms of embodiment described here, in which the valve 10 is provided with a threaded ring nut 45, or annular nut, or threaded ring, coupled with the first portion 13 and which includes inside it, housed in an annular seating, a packing 46, such as an O-ring. The threaded ring nut 45 can for example be knurled.

Figure 4:
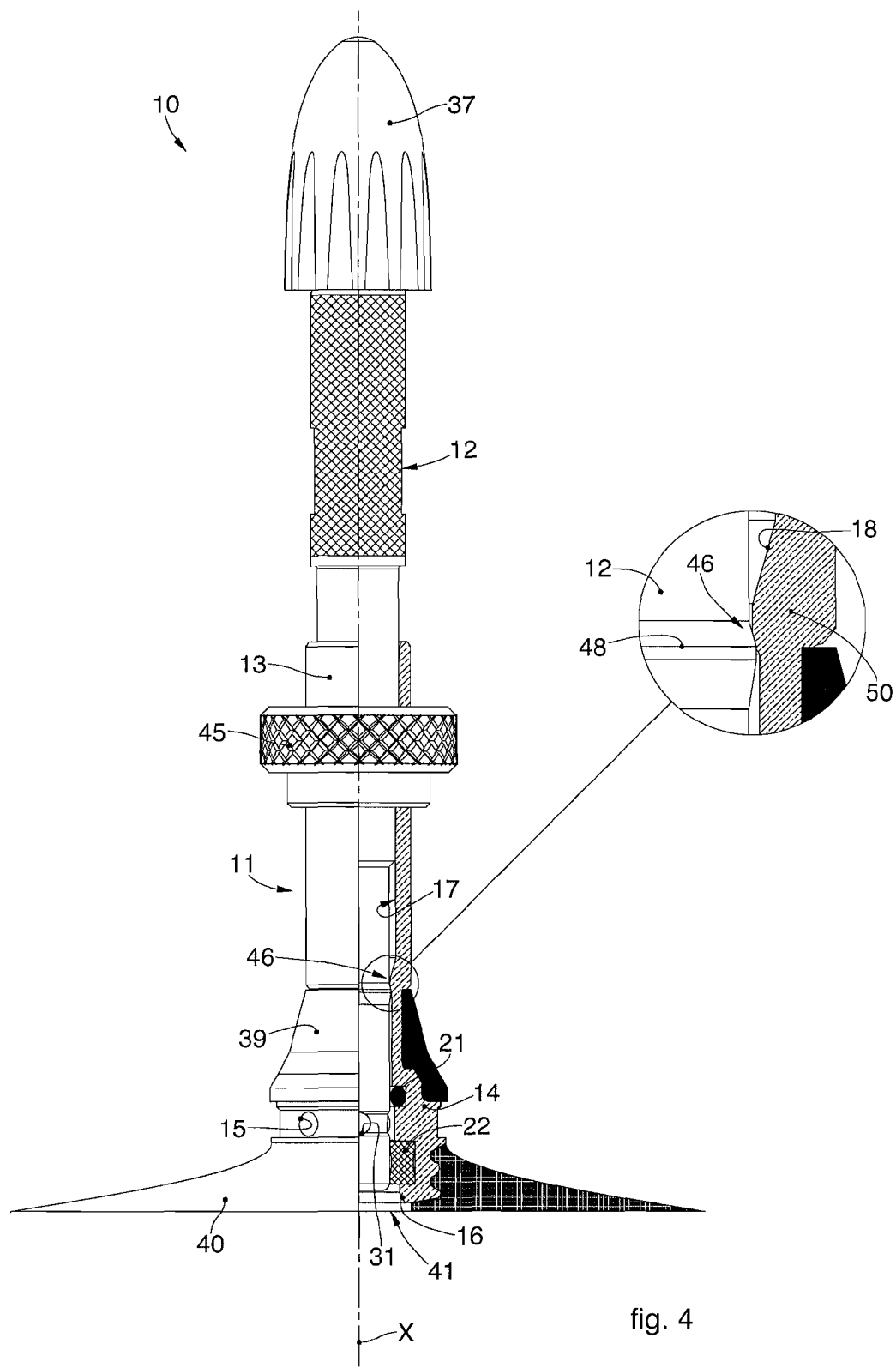

FIG. 4 is used to describe forms of embodiment, which can be combined with all the forms of embodiment described here, in which the valve 10 is in the first position of use, or high position, in which air is allowed to pass only from and toward the first external air chamber 34, through the first radial outlets 15 made on the second portion 14 of the fixed body 11. The enlarged detail in FIG. 4 is used to describe forms of embodiment of the mechanical stop system 46 to prevent the complete and unwanted axial removal of the mobile selector body 12 from the fixed body 11. This solution can therefore be for example an alternative to the clamping element 23 described using FIG. 1. The mechanical stop system 46 can be formed by a widened annular portion 48, for example protruding radially, provided on the mobile selector body 12 and by a narrowing protrusion 50 in the internal cavity 17 of the fixed body 11. The widened annular portion 48 and the narrowing protrusion 50 are reciprocally sized, also in relation to the internal diameter of the internal cavity 17, to cause a desired mechanical axial interference between mobile selector body 12 and internal wall 18 of the fixed body 11.

Figure 5:
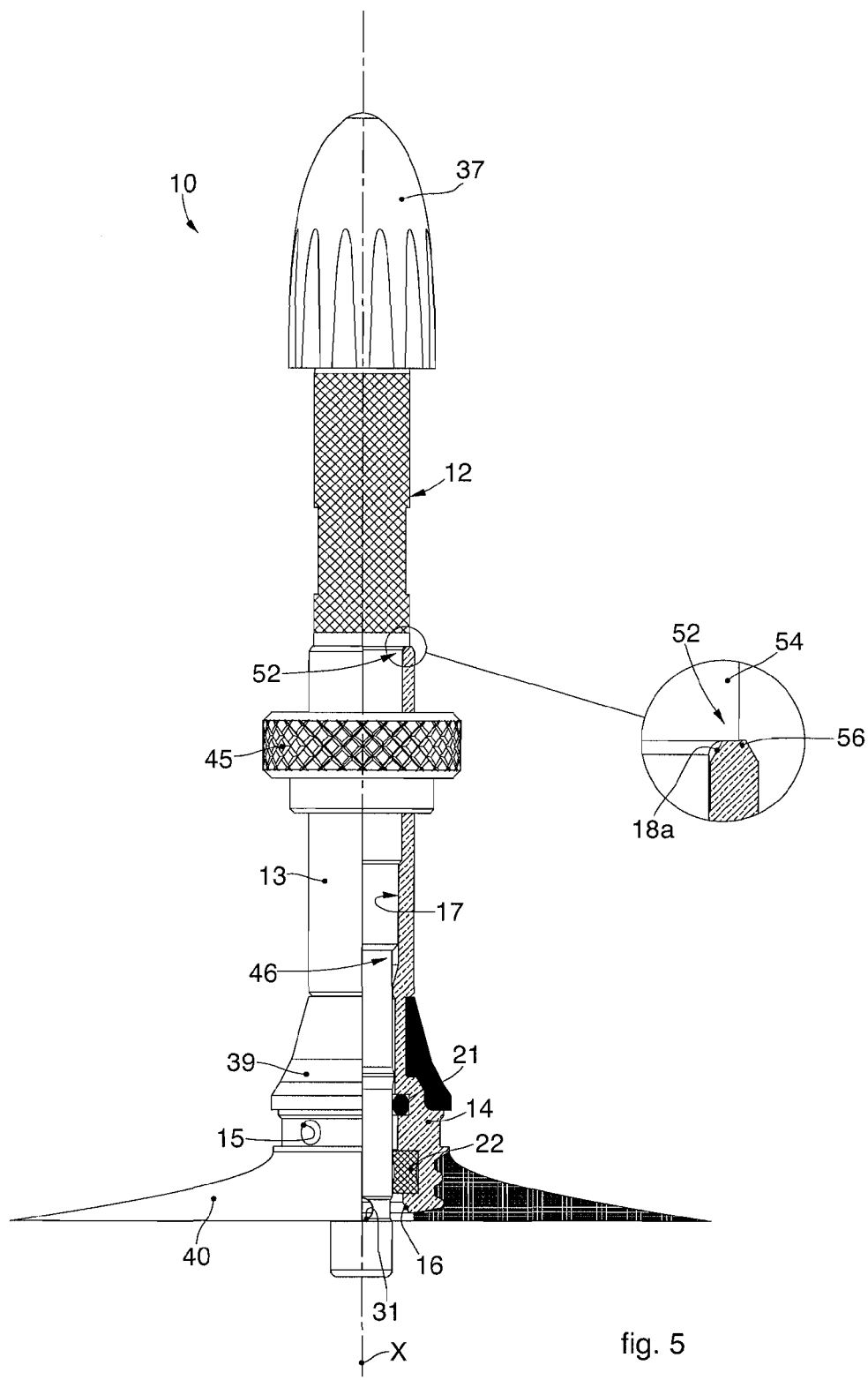

FIG. 5 is used to describe forms of embodiment, which can be combined with all the forms of embodiment described here, in which the valve 10 is in the second position of use, or low position, in which air is allowed to pass only from and toward the second internal air chamber 35, through the second longitudinal outlet 16 made on the bottom of the second portion 14 of the fixed body 11. The enlarged detail in FIG. 5 is used to describe forms of embodiment of the mechanical end-of-travel system 52 to prevent the mobile selector body 12 from being screwed infinitely to the fixed body 11. The mechanical end-of-travel system 52 can be formed by a protruding step or undercut 54 provided externally on the mobile selector body 12 and by an annular abutment edge 56 that delimits peripherally the insertion aperture 18*a* of the fixed body 11. The protruding step or undercut 54 and the annular abutment edge 56 are reciprocally sized to interfere axially and to stop the advance by the mobile selector body 12 toward the inside of the fixed body 11 once the whole threaded portion 19 has been screwed to the threaded zone 30. Advantageously, the position of the mechanical end-of-travel system 52 is such that the protrusion of the mobile selector body 12 from the fixed body 11 is very limited, to prevent damage to the mobile selector body 12 itself during the functioning of the valve 10 in applications such as a rolling tire. The mechanical end-of-travel system 52 is also shown in FIG. 1, and is applicable to the forms of embodiment described there, and in FIG. 2*b* the action of the end-of-travel is seen in the second position of use.

Figure 6:
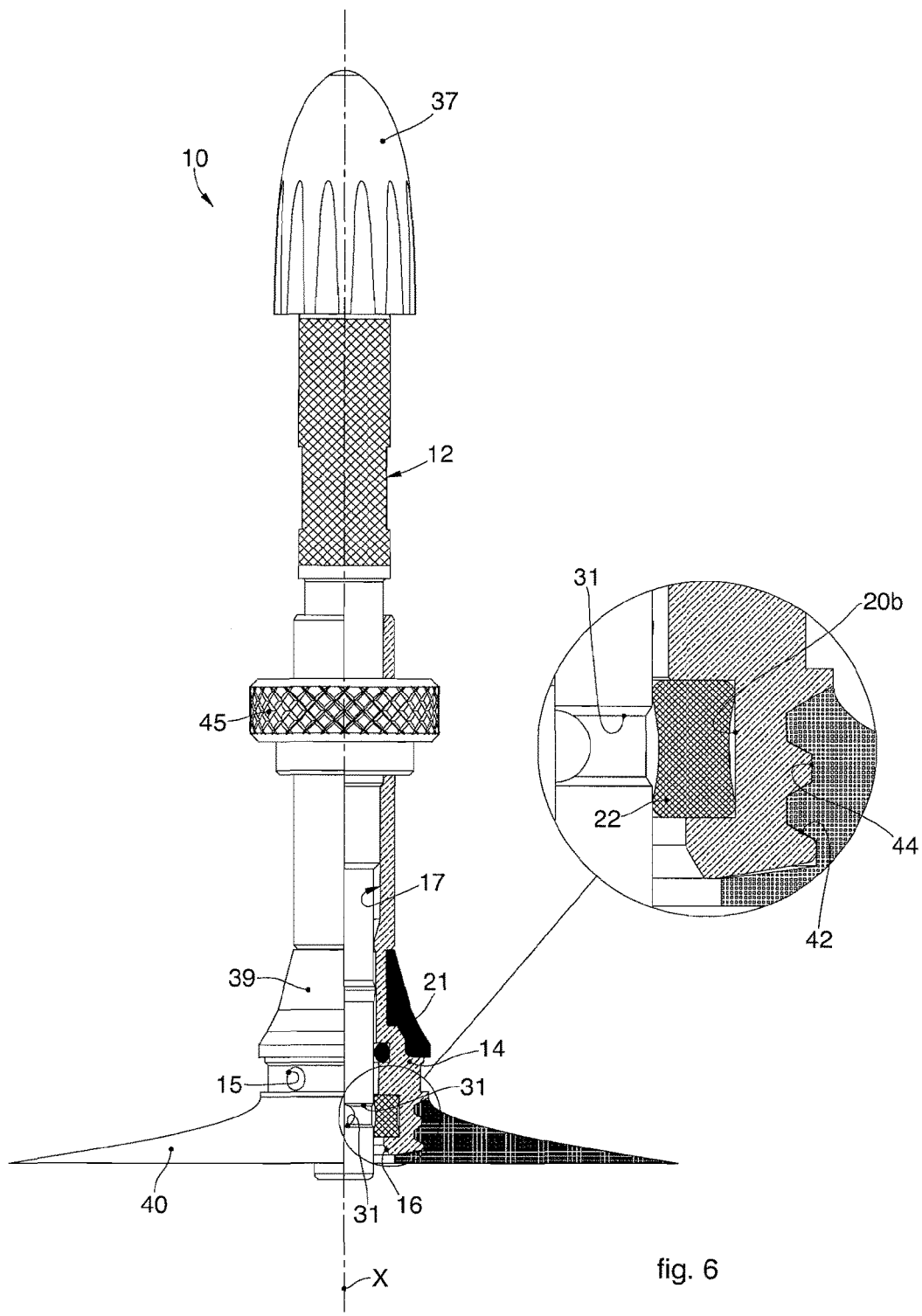

FIG. 6 is used to describe forms of embodiment, which can be combined with all the forms of embodiment described here, in which the valve 10 is in the intermediate position, in which no air is allowed to pass from or toward both the first external air chamber 34 or the second internal air chamber 35. Therefore, it is not allowed for the first external air chamber 34 and the second air chamber 35 to come into communication in any operating position of the mobile selector body 12 with respect to the fixed body 11, that is, there is no possibility of introducing or transferring air from the first external air chamber 34 to the second air chamber 35 or vice versa.

According to some forms of embodiment described here, which can be combined with all the forms of embodiment described here, the mechanical stop system 46 and the mechanical end-of-travel system 52 are advantageously disposed at a distance from each other such as to determine exactly the first position of use and the second position of use of the mobile selector body 12, in which, as we said, it is possible to communicate exclusively in a distinct manner, respectively with the first external air chamber 34 and the second air chamber 35. Only in these two first and second positions of use is there a distinct stream of air in one direction, respectively from and toward the first external air chamber 34 or from and toward the second air chamber 35. In the other intermediate positions of the mobile selector body 12 the first external air chamber 34 and the second air chamber 35 are completely isolated toward the outside and with respect to each other.

It is clear that modifications and/or additions of parts may be made to the valve for air chambers as described heretofore, without departing from the field and scope of the present invention.

It is also clear that, although the present invention has been described with reference to some specific examples, a person of skill in the art shall certainly be able to achieve many other equivalent forms of valve for air chambers, having the characteristics as set forth in the claims and hence all coming within the field of protection defined thereby.

Although the above refers to forms of embodiment of the invention, other forms of embodiment can be provided without departing from the main field of protection, which is defined by the following claims.

The invention claimed is:

1. Valve for air chambers comprising a fixed body and a mobile selector body, wherein the mobile selector body is disposed coaxially in the fixed body and said mobile selector body is configured to slide with respect to the fixed body along an axis, characterized in that the mobile selector body has a first position of use and a second position of use, wherein the fixed body is made with an internal cavity and in that said internal cavity comprises at least one seating, said at least one seating housing at least a first sealing element and a second sealing element, wherein said mobile selector body and said fixed body are configured to be coupled by screwing, said mobile selector body providing a threaded portion and said fixed body being provided with a first portion that comprises, in said internal cavity, a threaded zone mating with said threaded portion, wherein said fixed body comprises a second portion adjacent to the first portion, said second portion comprising one or more first radial outlets and one or more second longitudinal outlets, wherein said mobile selector body comprises an entrance zone, a channel for a passage of the air and one or more radial outlets configured to communicate respectively with said one or more first radial outlets in the first position of use and with said one or more second longitudinal outlets in the second position of use, a mechanical stop system being provided, configured to prevent axial dis-insertion of the mobile selector body and fixed body, and a mechanical end-of-travel system being provided, configured to define an end-of-travel of rotation screwing of the mobile selector body and fixed body.

2. Valve for air chambers as in claim 1, characterized in that the first and the second position of use of the mobile selector body are defined by the rotation of the mobile selector body with respect to the fixed body around the axis.

3. Valve for air chambers as in claim 1, characterized in that one or more first and second sealing elements are located in abutment on the at least one seating, each of the one or more first and second sealing elements made with a longitudinal through aperture, overlapping during use to determine a single aperture coaxial with respect to an axis of rotation and in that said first and second sealing elements are kept in abutment on the at least one seating by means of a clamping element.

4. Valve for air chambers as in claim 3, characterized in that the mobile selector body comprises a first zone, which in the first position of use is exposed with respect to the fixed body, a second zone connecting the mobile selector body to the fixed body and a third zone, during use housed in the aperture, whose position defines the first and second position of use.

5. Valve for air chambers as in claim 4, characterized in that a clamping strip is attached on an end portion of said third zone.

6. Valve for air chambers as in claim 2, characterized in that the mobile selector body is made with said passage channel that comprises the entrance zone, coaxial with respect to an axis of rotation, and the one or more radial outlets.

7. Valve for air chambers as in claim 3, characterized in that the first position of use is determined through extraction by rotation of the mobile selector body with respect to the fixed body until a clamping strip is taken in abutment on a clamping element so that the clamping element acts as an end-of-travel for the rotation of the mobile selector body, and in that in said first position of use each outlet of the mobile selector body is aligned with a hole of the second sealing element.

8. Valve for air chambers as in claim 3, characterized in that the second position of use is defined by the rotation of the mobile selector body until it determines insertion of a second zone in the fixed body, and when the second zone goes into abutment against the first sealing element it clamps the rotation of the mobile selector body so that the outlets of the mobile selector body are external with respect to the fixed body and aligned with the second outlet.

9. Valve for air chambers as in claim 3, characterized in that the mobile selector body has a third position, in which the one or more radial outlets face one of the first sealing elements isolating the entrance zone from the first and second outlets.

10. Valve for air chambers as in claim 1, comprising a single first sealing element and a second sealing element disposed in respective two sealing seatings, of which a first proximal sealing seating toward the entrance zone, and a second distal sealing seating, distant from the entrance zone.

11. Valve for air chambers as in claim 10, characterized in that in a part of the internal cavity of the second portion that is intermediate between the first sealing seating and the second sealing seating, said one or more first radial outlets are provided, and in that said second outlet opens onto a bottom of the second portion of the fixed body.

12. Valve for air chambers as in claim 1, comprising a sealing body made of vulcanized rubber, annular in shape with a central through seating to receive the second portion the fixed body, said second portion being externally provided with a corrugated surface able to cooperate with a mating corrugated surface made on internal walls of the central through seating of the sealing body.

13. Valve for air chambers as in claim 1, characterized in that the mechanical stop system comprises a widened annular portion provided on the mobile selector body and a narrowing protrusion in the internal cavity of the fixed body.

14. Valve for air chambers as in claim 1, characterized in that said fixed body comprises an insertion aperture through which to insert the mobile selector body.

15. Valve for air chambers as in claim 14, characterized in that the mechanical end-of-travel system comprises a protruding step provided externally on the mobile selector body and an annular abutment edge that delimits peripherally the insertion aperture of the fixed body.

16. Valve for air chambers as in claim 1, characterized in that the mechanical stop system and the mechanical end-of-travel system are disposed at a distance from each other such as to determine the first position of use and the second position of use of the mobile selector body.

17. Tire with a double chamber comprising a first air chamber and a second air chamber, different from each other, and comprising a valve for air chambers according to claim 1, wherein, in the first position of use the one or more first outlets are communicating with the first air chamber and in the second position of use the one or more second outlets are communicating with the second air chamber.

18. Tire with a double chamber as in claim 17, characterized in that the fixed body is constrained to the first air chamber and to the second air chamber and in that the first and the second position of use put the first air chamber and the second air chamber respectively into communication with the entrance zone of the mobile selector body.

19. Tire with a double chamber as in claim 17, characterized in that the first air chamber and the second air chamber are separated from each other by first sealing elements and by second sealing elements.

* * * * *